(12) United States Patent
Myers

(10) Patent No.: US 8,480,041 B2
(45) Date of Patent: Jul. 9, 2013

(54) BEAM CLAMP

(75) Inventor: Philip Allen Myers, Oak Ridge, NC (US)

(73) Assignee: Philip Allen Myers, Oak Ridge, NC (US)

( * ) Notice: Subject to any disclaimer, the term of this patent is extended or adjusted under 35 U.S.C. 154(b) by 297 days.

(21) Appl. No.: 12/800,929

(22) Filed: May 26, 2010

(65) Prior Publication Data

US 2010/0299891 A1 Dec. 2, 2010

Related U.S. Application Data

(60) Provisional application No. 61/217,142, filed on May 27, 2009, provisional application No. 61/217,673, filed on Jun. 3, 2009, provisional application No. 61/217,141, filed on May 27, 2009.

(51) Int. Cl.
*F16L 3/24* (2006.01)
*F16B 1/00* (2006.01)

(52) U.S. Cl.
USPC .......... 248/72; 248/74.2; 248/228.3; 24/16 R; 24/455

(58) Field of Classification Search
USPC ............. 248/72, 73, 228.31, 49, 57, 62, 68.1, 248/74.1, 74.2, 228.1, 228.2, 228.3; 24/16 R, 24/68 R, 454, 455, 460, 19, 268
See application file for complete search history.

(56) References Cited

U.S. PATENT DOCUMENTS

| | | | |
|---|---|---|---|
| 497,679 A | 5/1893 | Newbury | |
| 919,558 A | 6/1908 | Doran | |
| 1,974,628 A * | 9/1934 | Donald | 248/228.3 |
| 2,470,992 A | 5/1949 | Kindorf | |
| 2,642,243 A | 6/1953 | Kindorf | |
| 2,765,139 A | 10/1956 | White | |
| 2,877,974 A | 3/1959 | Estes | |
| 2,916,244 A | 12/1959 | Renfroe | |
| 3,140,848 A | 7/1964 | Sherburne | |
| 3,292,888 A | 12/1966 | Fischer | |
| 3,301,513 A | 1/1967 | Sugaya | |
| 3,321,161 A | 5/1967 | Hirt | |
| 3,377,038 A | 4/1968 | Loudon | |
| 3,463,428 A * | 8/1969 | Kindorf et al. | 248/72 |
| 3,469,810 A | 9/1969 | Dorris | |
| 4,044,428 A * | 8/1977 | Kowalski | 24/16 R |
| 4,046,344 A * | 9/1977 | Scanlan | 248/72 |
| 4,541,155 A | 9/1985 | Gagnon | |
| 4,558,521 A * | 12/1985 | Steck et al. | 33/533 |

(Continued)

OTHER PUBLICATIONS

Prior Art. I-Beam Clamp Kit. Developed by Philip Myers, Printed for C.E. Smith Company 2008.

(Continued)

*Primary Examiner* — Tan Le
(74) *Attorney, Agent, or Firm* — Philip P. McCann; Smith Moore Leatherwood LLP

(57) ABSTRACT

A beam clamp providing for a positive attachment to I-beams, H-beams, T-bars, pairs of conventional angles, bulb angles, channels, plates and other similar structural shapes wherein the beam clamp includes a pair of clamping hooks incorporated into opposing clamp bodies that capture an attached elongated rectangular, round or other shape. The shapes are secured against the structure using one or more bolt with nut assemblies to pull the halves together towards each other and the attached member and towards the structure.

15 Claims, 18 Drawing Sheets

U.S. PATENT DOCUMENTS

Figure 1:
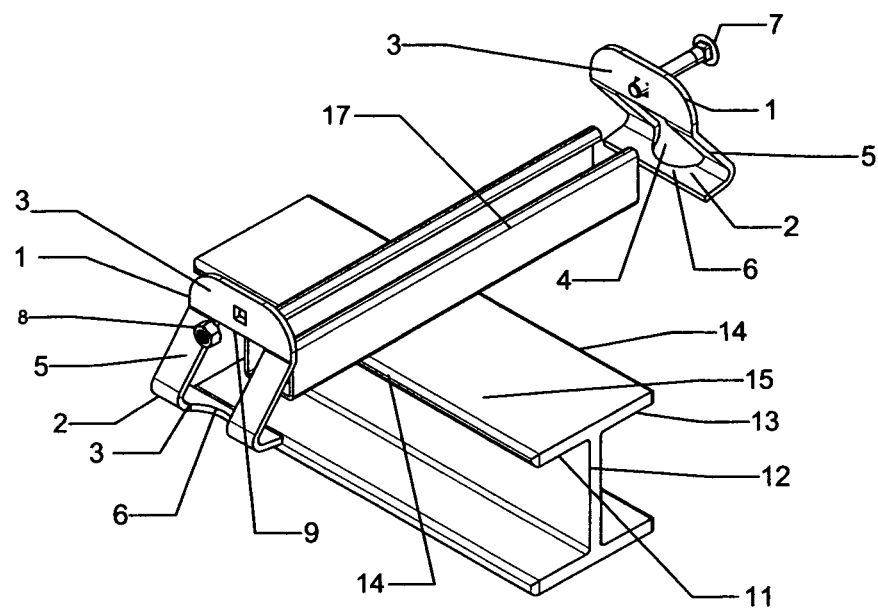

| | | | |
|---|---|---|---|
| 4,834,186 A * | 5/1989 | Ballard | 248/57 |
| 5,067,683 A * | 11/1991 | Wager | 248/545 |
| 5,146,724 A | 9/1992 | Angelo | |
| 5,947,424 A | 9/1999 | Heath | |
| 6,334,285 B1 | 1/2002 | Kirschner | |
| 6,494,642 B1 * | 12/2002 | Daly | 248/228.3 |
| 6,520,705 B2 * | 2/2003 | Stasney, Jr. | 248/72 |
| 7,591,442 B2 * | 9/2009 | Dinh et al. | 248/73 |

OTHER PUBLICATIONS

Examples of Common Beam Clamps. Multiple sources. 3 sheets.

* cited by examiner

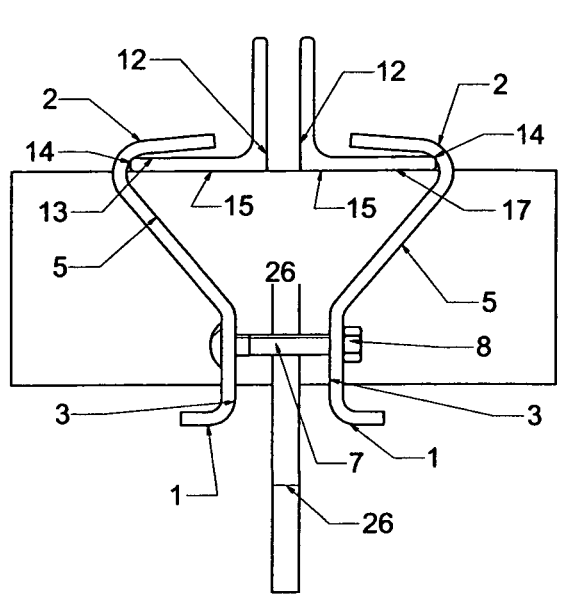
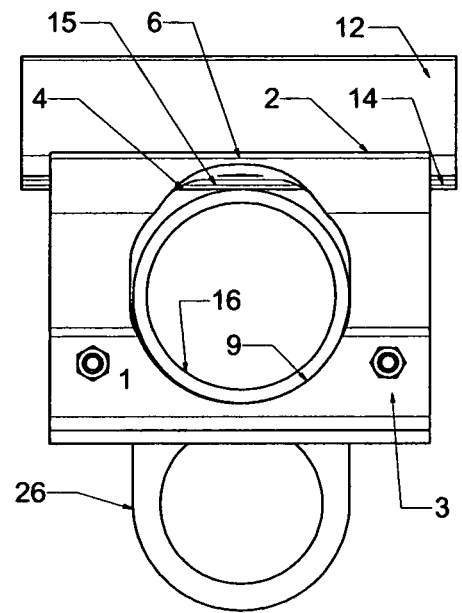
Fig. 19     Fig. 20
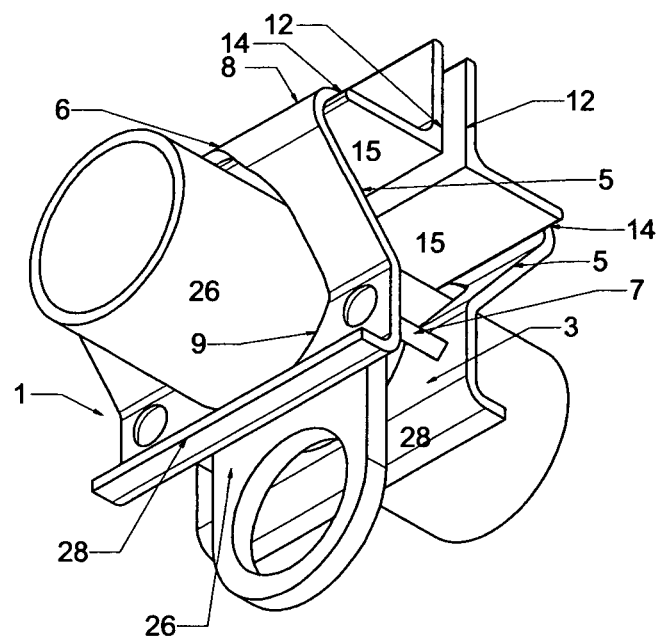
Fig. 21

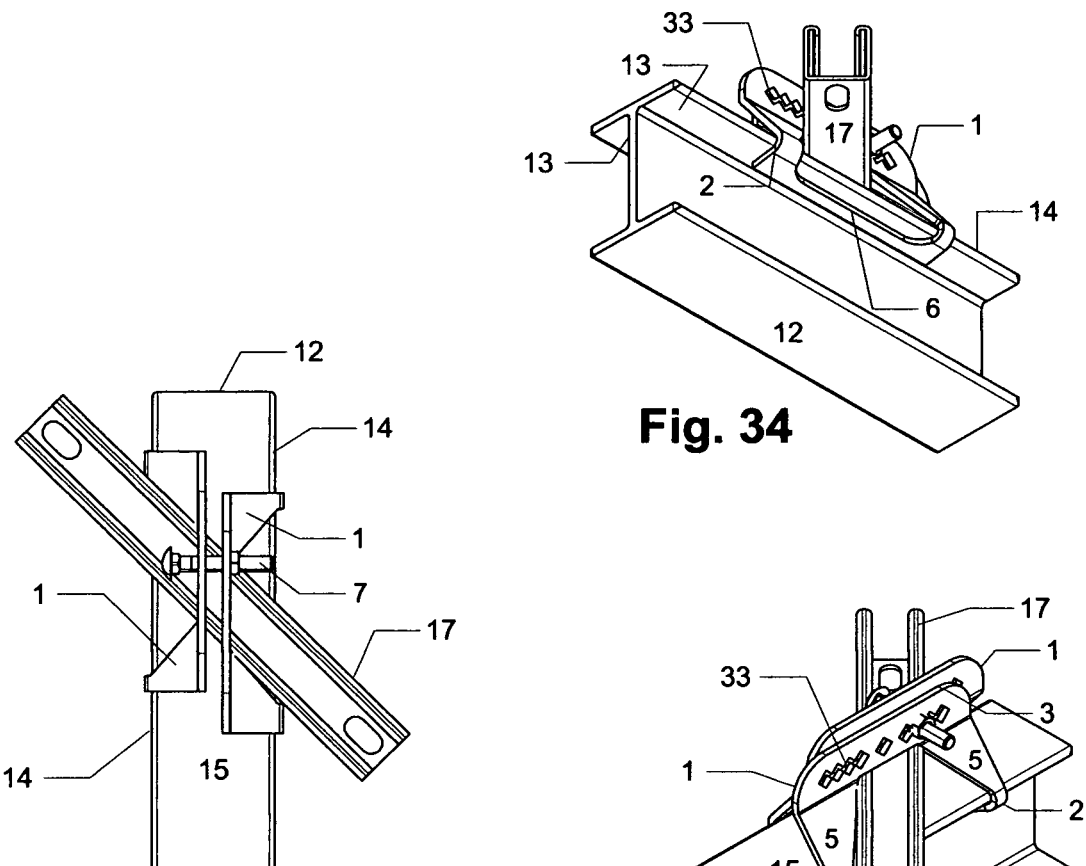
Fig. 34
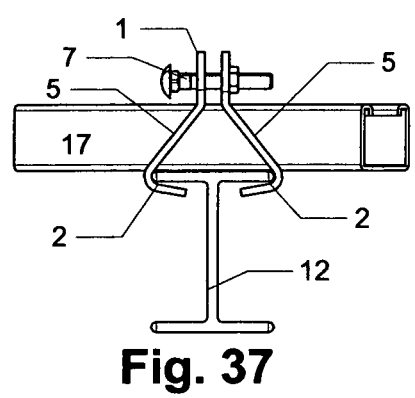
Fig. 35
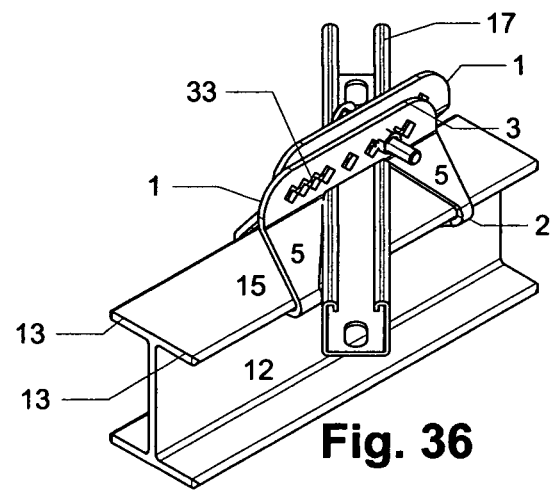
Fig. 36
Fig. 37

BEAM CLAMP

CROSS-REFERENCE TO RELATED APPLICATIONS

Provisional patent application 61/217,142 with a filing date of May 27, 2009 and provisional patent applications 61/217,673 filed on Jun. 3, 2009 and 61/217,141 filed on May 27, 2009 and being submitted as a non provisional patent application along with this one.

FEDERALLY SPONSORED RESEARCH

Not Applicable

SEQUENCE LISTING OR PROGRAM

Not applicable

REFERENCES CITED

U.S. Pat. No. 6,334,285B1 Jan. 1, 2002 Kirschner 52/702

BACKGROUND

1. Field

This application relates to the attaching of structural and accessory members to each other. Specifically for attaching, a member to beams or other structural configurations that have 2 fixed opposing edges that allow opposing clamp halves to hook around and the attaching member be held against one or more surfaces that is oriented in a planar surface generally between the opposing edges as a I-Beam embodies.

2. Prior Art

Clamps are often used as hangers for supporting and attaching a variety of items such as pipes, electrical devices, lighting equipment, heating fixtures, cables, conduit, duct, channel struts, for example, from a variety of structural members such as I-beams, T-bars, steel trusses and other structural shapes that include two juxtaposed edges. This system of attachment of common hardware and methods used for supporting hardware within building structures are based on strut channels that were developed in the 1920's with small advancements since then. While the means of attaching to the strut channels have developed the basic strut channel has not changed.

Often strut channels attached to I-beams are used to support a number of different items such as pipe, lighting and heating fixtures, cables, conduit, duct and struts using an appropriate means of clamping or attaching to the struts which are attached to I-beams at near to a right angle to the edges of the flange of the beam. Struts are normally attached to beams using two sets of u-bolts, one set on each side of the I-beam flange with a bent plate with two holes that the threaded ends of a u-bolt pass positioned on the opposite side of the beam flange that contain the strut channel to the outer side of the flange of the beam. Struts are also attached using a plate bent to a C-clamp shape that has a rectangle opening in the middle surface for the strut to pass, being positioned, on an outside surface of the beam with a bent portion with a threaded hole for a bolt to be tighten against the inside portion of the beam flange to pull the strut against the I-beam. This type of clamp has a greater tendency to twist, pivoting about the bolt that carries the load, possibly leading to the loosening of the bolt. Two such clamps are always needed, to support the strut. Both of these methods for attaching the struts to the I-beam depend entirely on the strength of the threaded fasteners to provide both the clamping force and hold the weight of the load.

My invention preferably uses one bolt to pull two apposing clamp bodies, preferably made from ridged flat material, that are preferably bent generally in the shape of a "?" question mark that have passages through the flat center portion for members, including struts, conduits and pipes, to pass and have one end curved in an acute angle to capture the edge of the flange of the beam or structure. Most of the forces for holding the member in place against the outer beam flange are accomplished by the clamp and not as much by the bolt or other pulling feature that pulls the ends, outside the supported member, together. In fact, a small force such as pinching with a finger and thumb provides enough strength to allow a strut channel, to be temporally and securely held by the assembly. My invention is much easier to install than any existing method.

My invention is also very vibration resistant. Even after being fully tightened then partially loosened substantial holding remains. Other methods are not capable of this.

My invention includes new methods that enable a number of functions to be accomplished not currently feasible. Strut channels, pipes, conduits, boards and other members can be attached in line or at a non perpendicular angle in relation to the structures being joined, particularly in the center of the outside of an I-beam flange without drilling holes or welding. This is accomplished by using a cross bar or adapter channel that uses the same clamp described above to securely hold members to the I-beam. Different shapes of members can be attached using an accessory in conjunction with the clamp apparatus. These accessories include; cross members, adapters, shields, insulation and protective padding materials. The accessories allow attachment of sensitive materials in either direction and allow for movement such as is caused by expansion and contraction resulting from changes in temperature.

Another advantage of this invention is that it allows supported members to attach to a wide range of sizes and shapes of I-beams and other configurations for each size of clamp. Within a range of widths and thicknesses of a beam or other configurations, the same size clamp can be used with the only change being the length of bolt needed for providing the squeezing action between the two sides of the clamping assembly.

Another style of a clamp assembly can use multiple bolts for pulling together along with a bent flange across the bolted end also known as the pulling end, to add strength and rigidity for holding larger pipes and other members being secured or attached. This style of clamp also lends itself to providing support for a heavy load suspended from a single point such as attachment of a hoist either on a temporary basis or permanently. A plurality of the clamp assembly can be used as needed.

There are no known patents similar to my invention. The closest item that compares to my invention is a clamp I developed specifically for attaching 1½" square tubing to boat trailer frames constructed of I-beams. The clamp assembly is used for attaching accessories to boat trailers. This was exposed 3 years ago. I have since, been developing a collection of attachment hardware for fastening conduits, pipes, struts and other hardware to the structures of commercial buildings. I have submitted two other provisional patents covering other utilities in addition to those contained in this application (see cross reference to related patents). I have invented new methods for clamping different structure and accessory members together including many new ways that various clamps can be configured adding utility using other devices, which significantly and innovative broaden the use. The original configuration features two hooks that a 1½" square tube to passes between. The new configuration for clamping rectangle shaped members features a closed passage with one continuous hook that provides greater strength eliminating the possibility of the two hook portions of the clamp bodies from twisting and further increasing the overall strength of the configuration. By providing non-interrupted connection between both sides of each clamp it allows easier installation by allowing for the clamps to be slid over the member being attached to the I-beam. Clamps are positioned without the tendency to fall off during installation. The use of a passage also assures the space where the objects being attached to the structure remains the required distance needed for the objects to pass.

The inclusion of flanges or integral ribs also add to the utility and strengthens the clamp body.

Another new utility involves the use of a curved clamping edge in the internal passageway that allow attaching a variety of round supported members to be held with both an open passage style of clamp and a closed style.

Another utility, for both a clamp with a continuous hook and for a clamp with multiple hooks, is to incorporate multiple passageways in the clamp bodies allowing a clamping a plurality of members.

During the time that the prior art item was exposed to numerous individuals familiar in the art, to my knowledge, no one except me suggested any of the utilities that I am claiming.

SUMMARY

A clamp assembly that have two opposing bodies connected together using one or more means for pulling the member gripping end of the clamp bodies toward each other and down against the member. The preferred method for pulling the clamp bodies toward each other is the use of sets of bolts and nuts. The clamp bodies hook around the opposite edges of a flange of a structure such as an I-Beam, rotating towards each other, capturing said member inside the passage of the clamp body, and pushing the interior edge against the member being attached to the I-beam or structure. Accessory items are used to adapt to and secure, in different ways, the member(s).

The two opposing clamp bodies use a pivoting action with the vertex at the point where the inside radius on the hook end of the clamp bodies are in contact with the edges of the structure where the member is being attached to. One or more bolts may be used to pull the two parts of the clamp towards each other creating a clamping force along the inside portion of the member passage furthest from the structural member, that the member attached, is being clamped against. The edge of the passage nearest the holes, for the bolts, transfers the force against the member being clamped, is profiled to the shape and size of the member. As the two opposing clamp bodies are pulled together, using a threaded fastener or other means to pull, the halves pivot around the flange edge or other structures forcing the inside of the cutout against the member being attached.

Further utilities are accomplished by the using crossbars, channels, and adapters, to span between each opposing clamp body to transfer a clamping force from the clamp bodies to fasten round, rectangle and other shaped members to the structural member.

Larger objects are clamped using additional holes. This allows additional threaded fasteners, for pulling the two bodies of the clamp together. Flanges or ribs are added, to the bodies, to strengthen the clamps.

When the position of the members being clamped, is at a lower level than the supporting member, then a configuration that allow a member to support subsequent members at a lower lever or in a different direction is used.

DRAWINGS

Figures

FIG. 1 Isometric exploded view of an assembly as seen from the mounting surface side of a strut channel attached to I-Beam.

Figure 2:
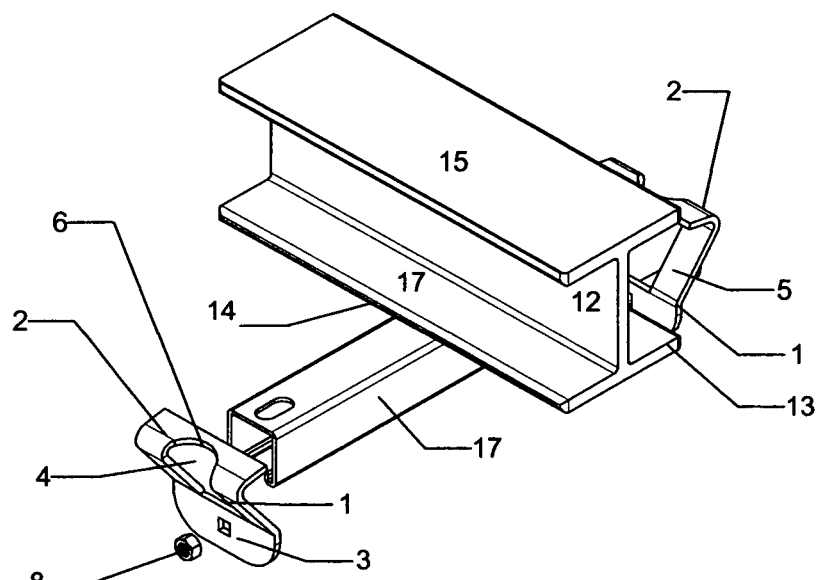

FIG. 2 Isometric exploded view of an assembly as seen from the structure side of a strut channel attached to I-Beam.

Figure 3:
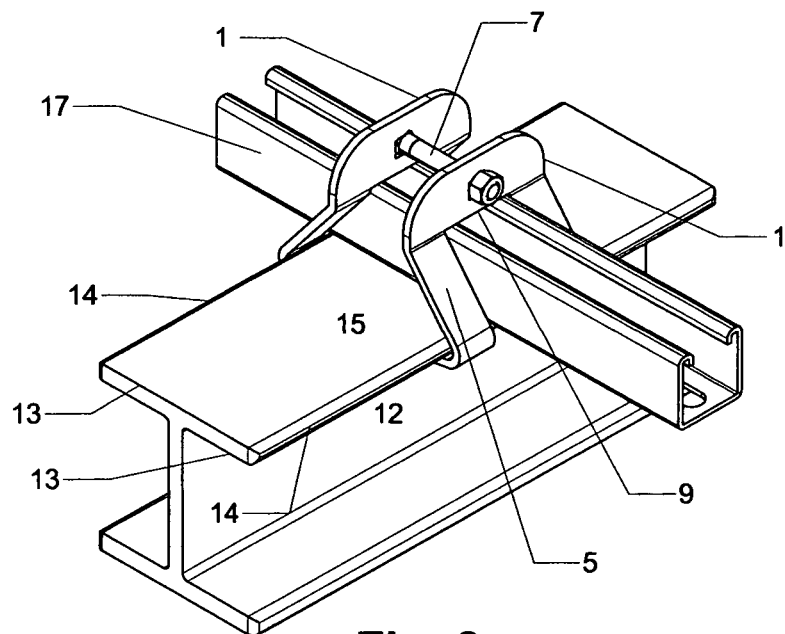

FIG. 3 Isometric view of an assembly as seen from the mounting surface side of a strut channel attached to I-Beam. This is the best Use.

Figure 4:
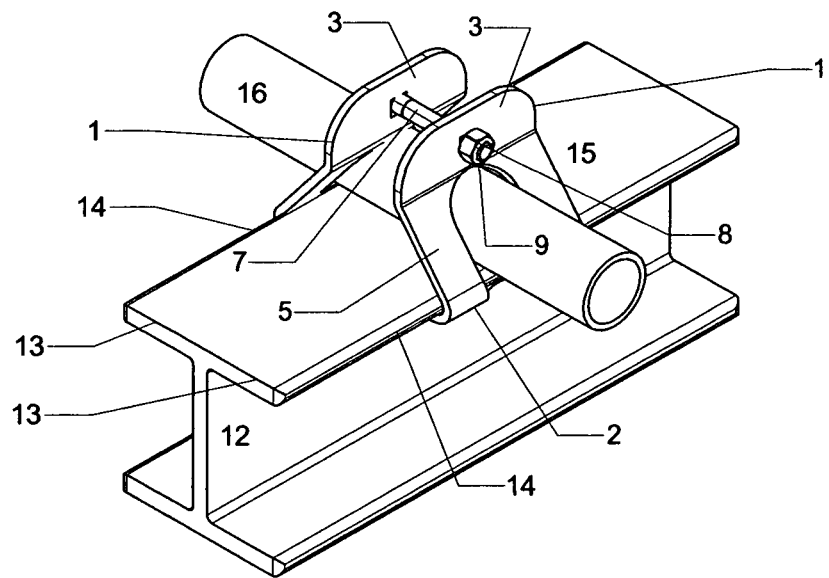

FIG. 4 Isometric view of an assembly as seen from the mounting surface side of a round tube attached to an I-Beam.

Figure 5:
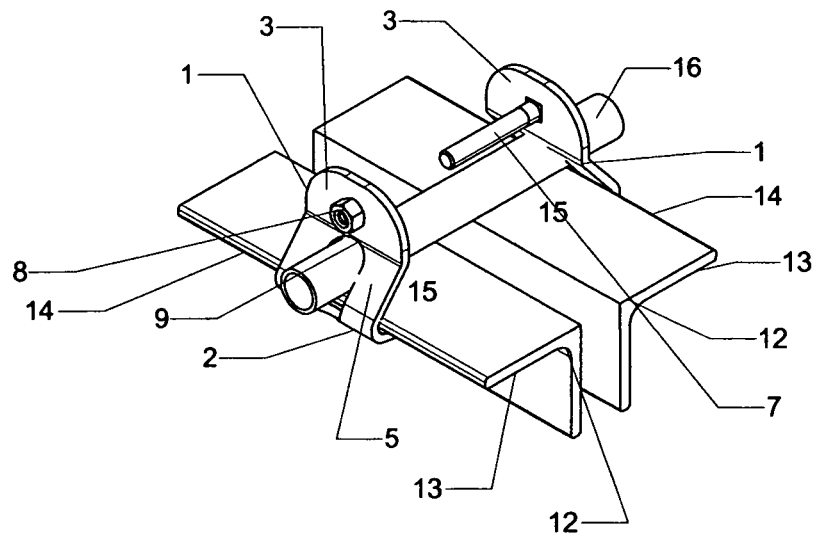

FIG. 5 Isometric view of an assembly as seen from the mounting surface side of a round tube attached to a double structural angle assembly.

Figure 6:
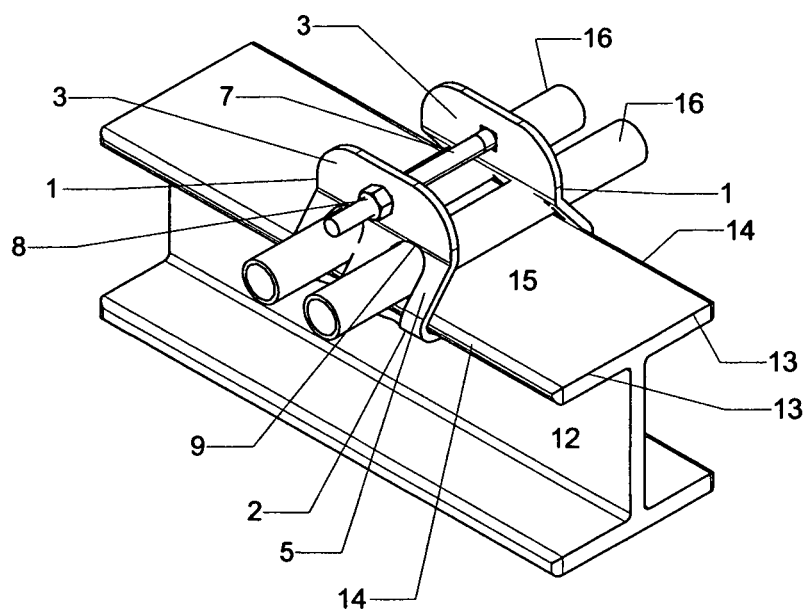

FIG. 6 Isometric view of an assembly as seen from the mounting surface side of two round tubes attached to I-Beam.

Figure 7:
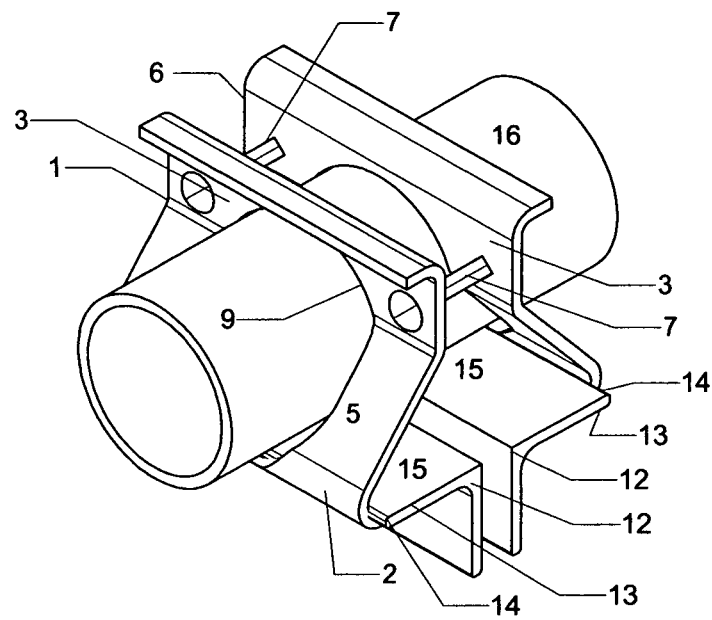

FIG. 7 Isometric view of an assembly that uses two sets of bolts as seen from the mounting surface side of a large round tube attached to a double structural angle assembly.

Figure 8:
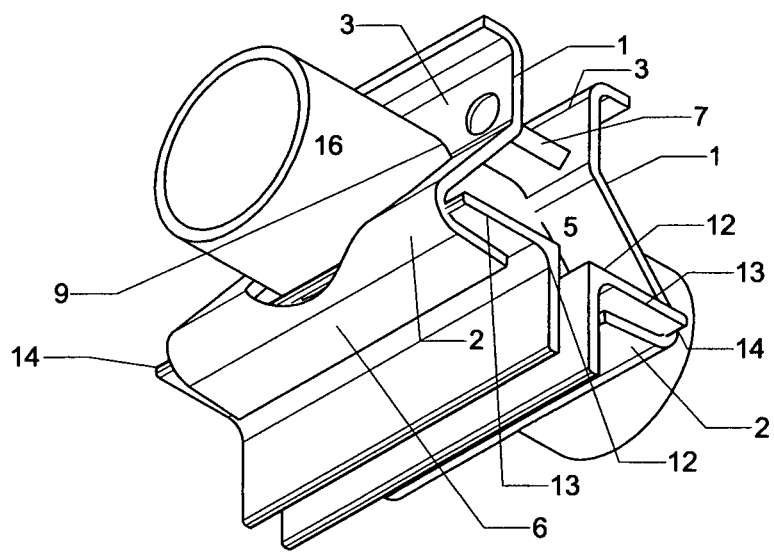

FIG. 8 Isometric view of an assembly that uses two sets of bolts as seen from the structure side of a large round tube attached to a double structural angle assembly.

Figure 9:
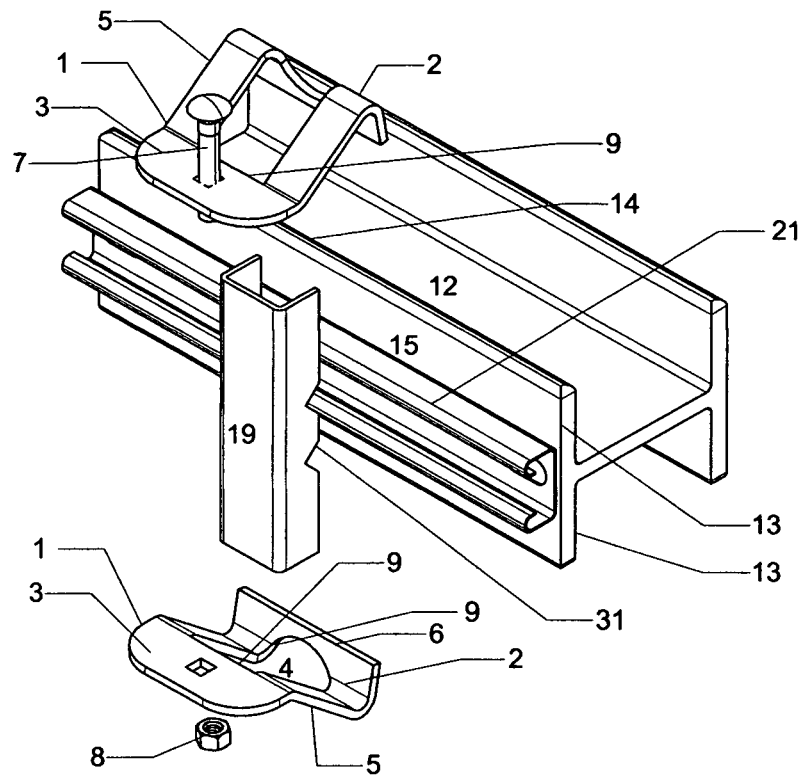

FIG. 9 Isometric exploded view of a low profile strut channel mounted inline on the surface of an I-Beam as seen from the mounting surface side of strut channel attached to I-Beam. It shows the clamping bar with the cutouts that allow a firm gripping of the strut channel holding it near the center of the mounting surface area as is allowed by the space between clamp bodies.

Figure 10:
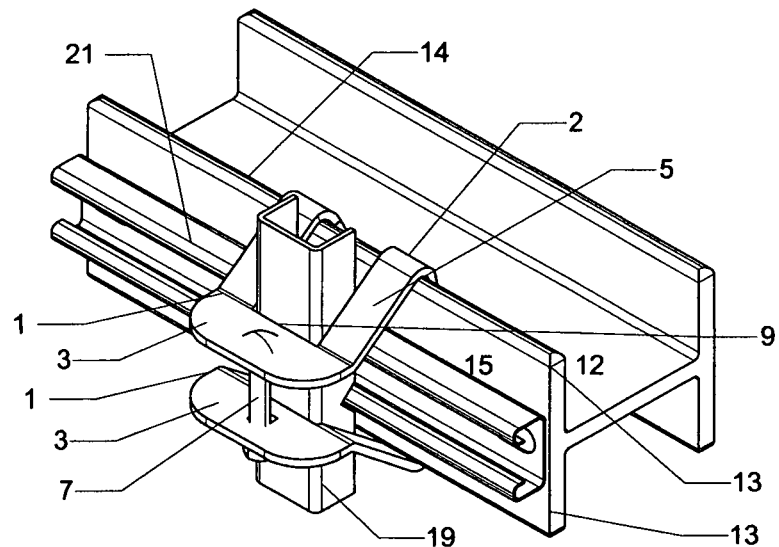

FIG. 10 Isometric view of a low profile strut channel mounted inline on the surface of an I-Beam as seen from the mounting surface side of strut channel attached to I-Beam.

Figure 11:
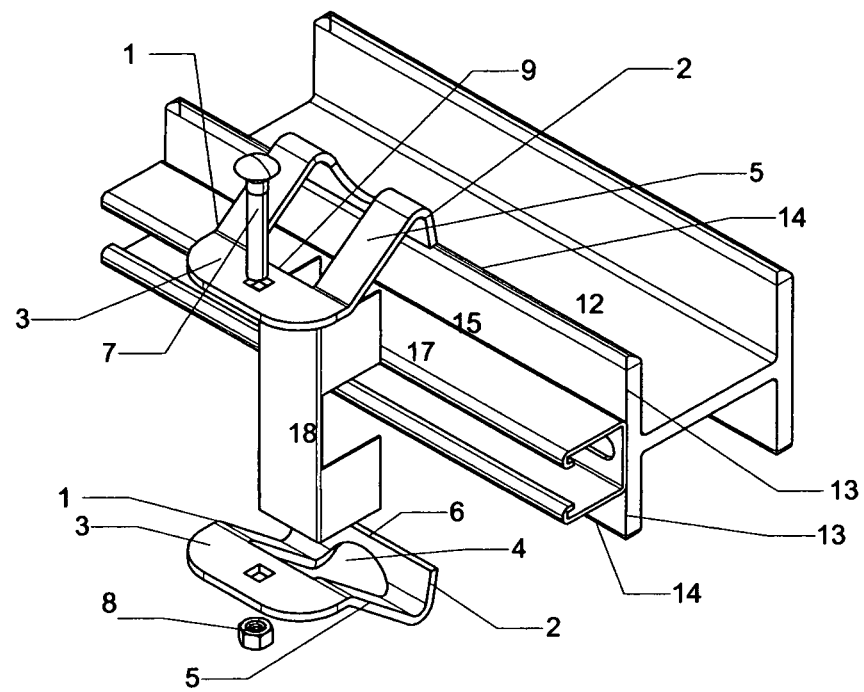

FIG. 11 Isometric exploded view of a strut channel mounted inline on the surface of an I-Beam as seen from the mounting surface side of strut channel attached to an I-Beam. It shows the squeezing channel with the cutouts that provides gripping on three sides of the strut channel with the channel placed near the center of the mounting surface area.

Figure 12:
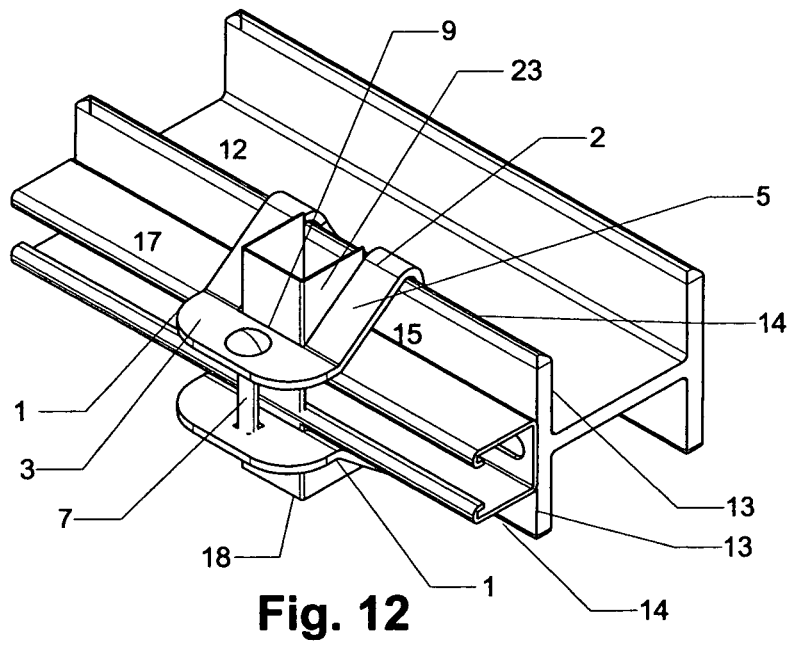

FIG. 12 Isometric view of a strut channel mounted inline on the surface of an I-Beam as seen from the mounting surface side of strut channel attached to I-Beam. It shows the squeezing channel with the cutouts that provides gripping on three sides of the strut channel with the channel placed in the center of the mounting surface area.

Figure 13:
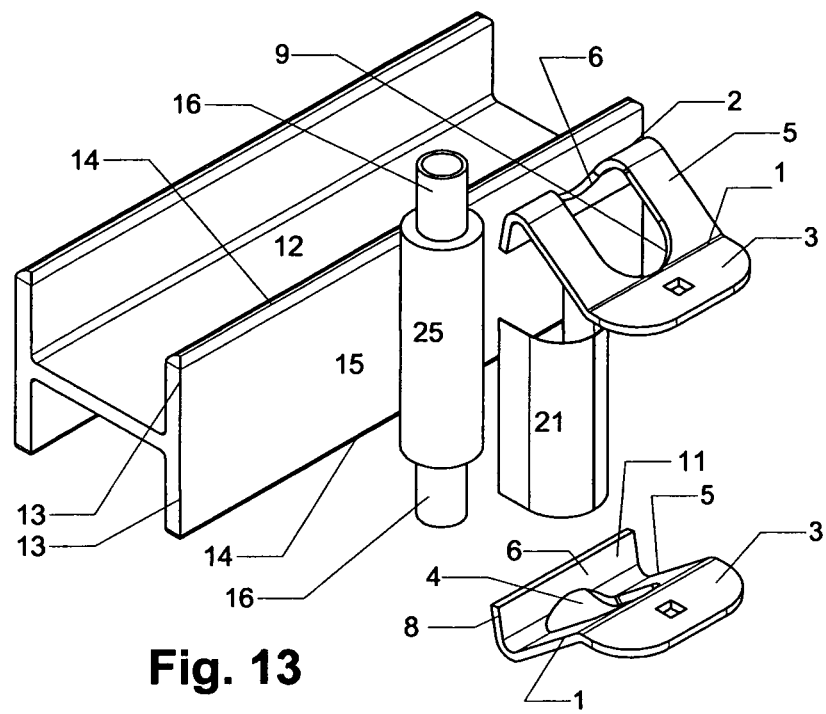

FIG. 13 Isometric exploded view of a protected round tube mounted perpendicular to and on the surface of the I-Beam as seen from the mounting surface side of the assembly. It shows the tube surrounded by tubular shaped soft material, covered with a u-shape shield protecting and containing said material and allowing the clamp to grip the said items.

Figure 14:
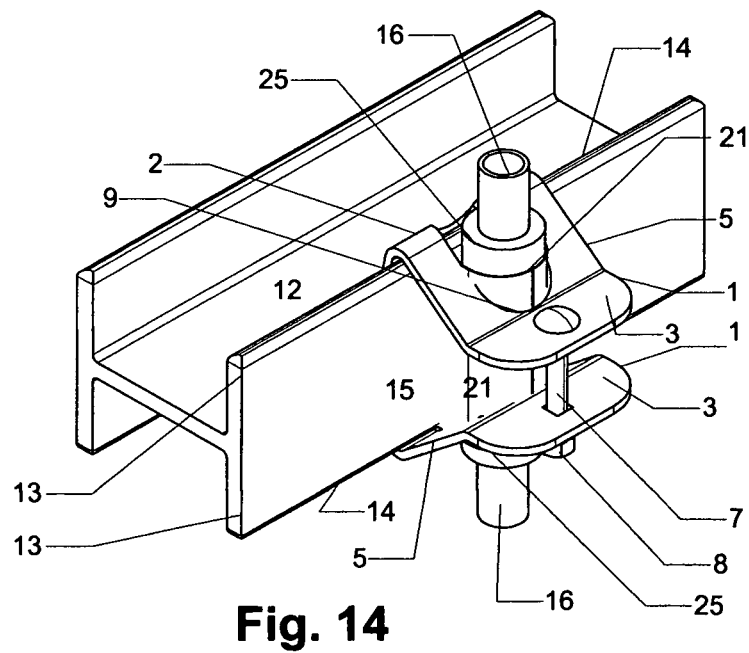

FIG. 14 Isometric view of a protected round tube mounted perpendicular to and on the surface and edge of the I-Beam as seen from the mounting surface side of the assembly. It shows the tube surrounded by tubular shaped soft material, covered with a u-shape shield protecting and containing said material and allowing the clamp to grip the said items.

Figure 15:
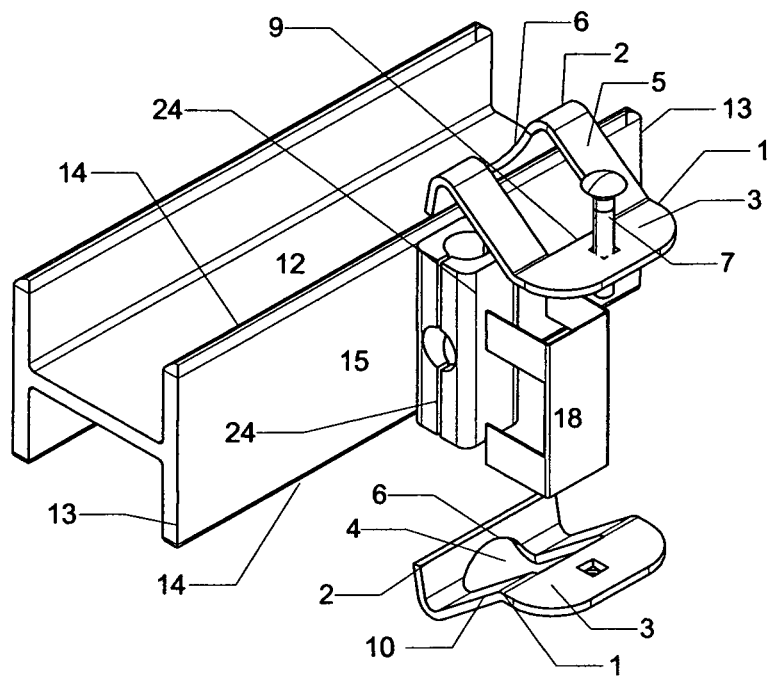

FIG. 15 Isometric exploded view of an assembly with a two way block used to hold and protect a round tube mounted either perpendicular to edge of or in line on the surface of the I-Beam as seen from the mounting surface side of the assembly. It shows the said block covered with a Square shield protecting and containing said block and allowing the clamp to grip the said block.

Figure 16:
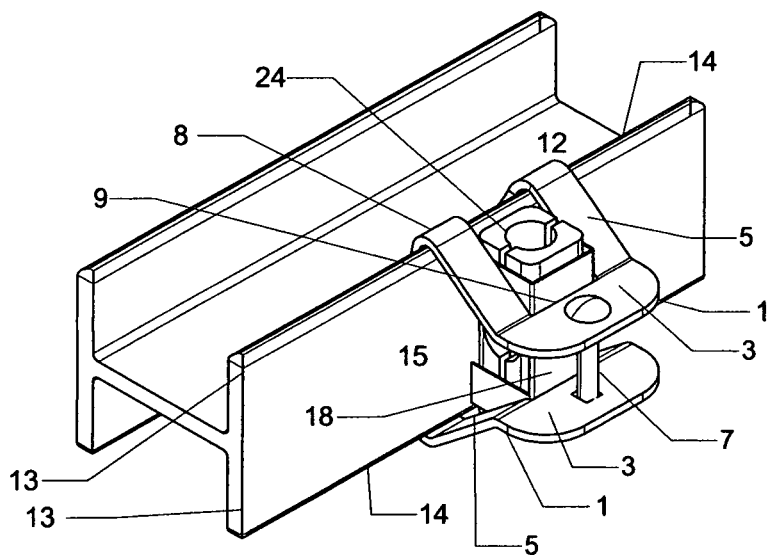

FIG. 16 Isometric view of an assembly with a two way block used to hold and protect a round tube mounted either perpendicular to edge of or in line on the surface of the I-Beam as seen from the mounting surface side of the assembly. It shows the said block covered with a Square shield protecting and containing said block and allowing the clamp to grip the said block.

Figure 17:
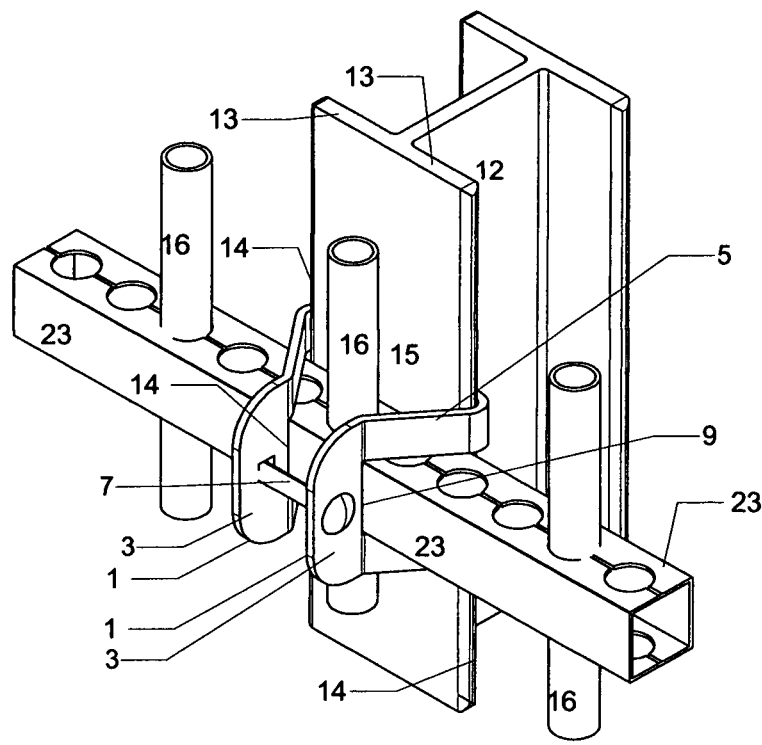

FIG. 17 Isometric view of a Multi-object channel attached to an I-Beam that allows multiple tubular objects to be attached in line with the length of the I-beam.

Figure 18:
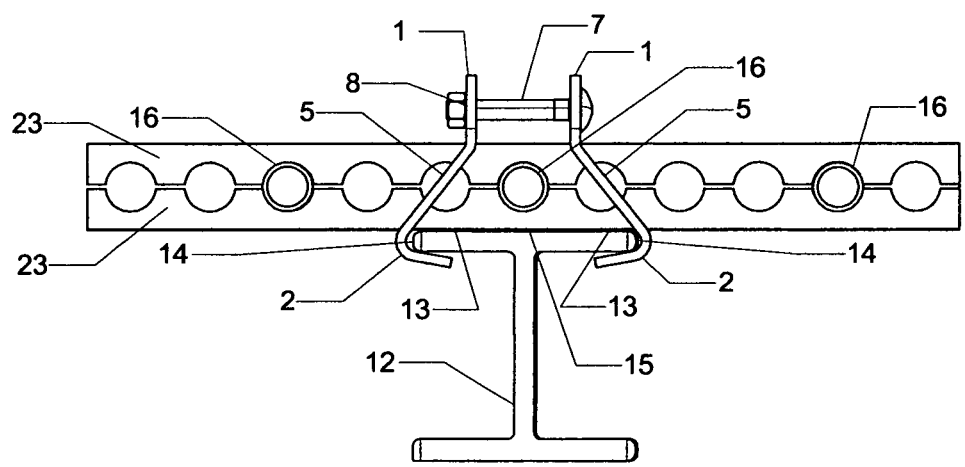

FIG. 18 End view of a Multi-object channel attached to an I-Beam that allows multiple tubular objects to be attached in line with the length of the I-beam.

FIG. 19 End view of a single point load hanging assembly. A plate or other member with a hole is attached to a supported round member that allows loads to be suspended from the assembly attached to a supporting structure.

FIG. 20 Side view of a single point load hanging assembly. A plate with a hole is attached to a supported member that allows loads to be suspended from the assembly attached to a supporting structure.

FIG. 21 Isometric view of a single point load hanging assembly with a plate with a hole attached to a supported member that allows loads to be suspended from the assembly attached to a supporting structure.

Figure 22:
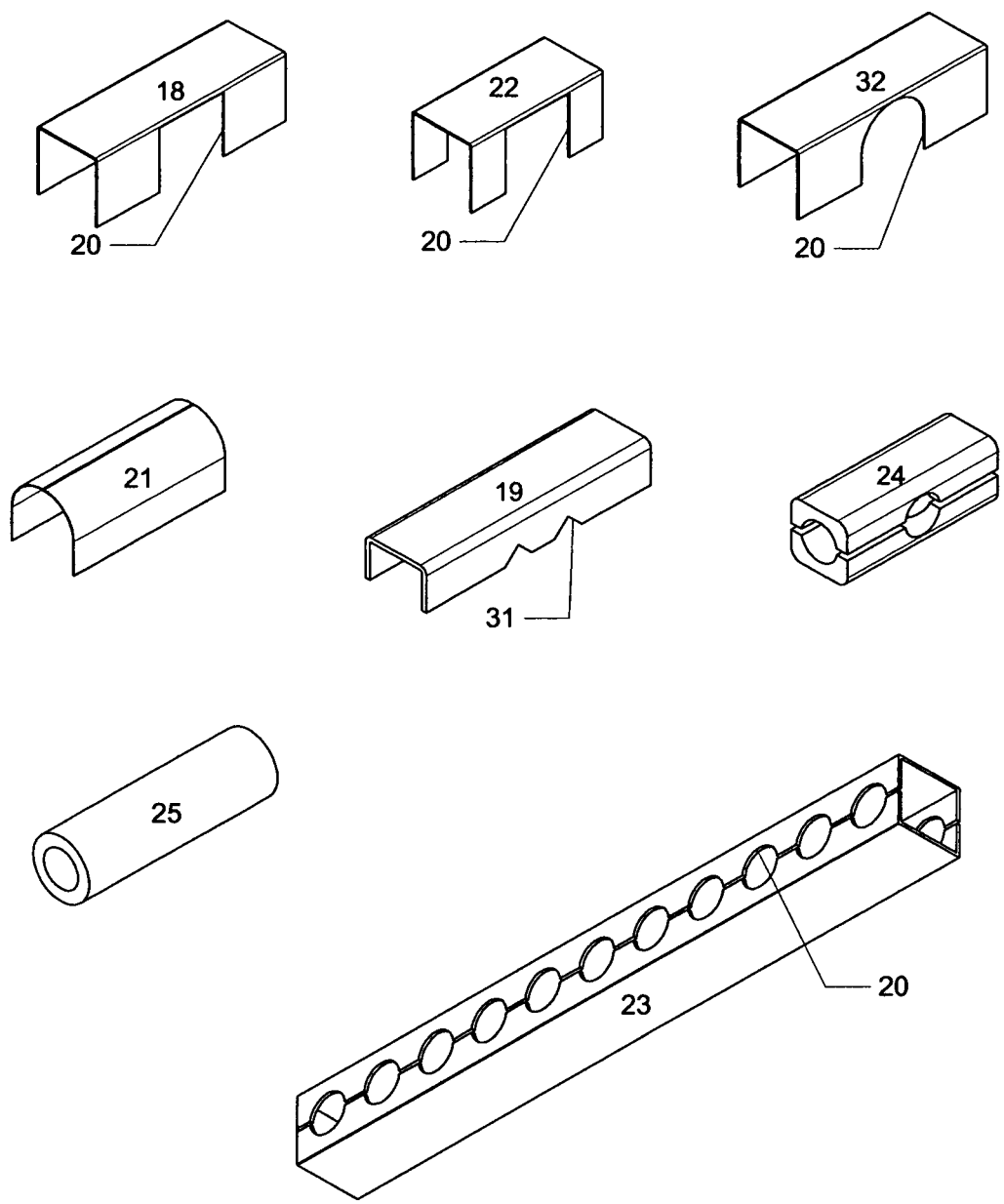

FIG. 22 this figure is for illustration purposes. Isometric views of a collection of previously identified accessories used to adapt, shield, grip, hold and protect supported members.

Figure 23:
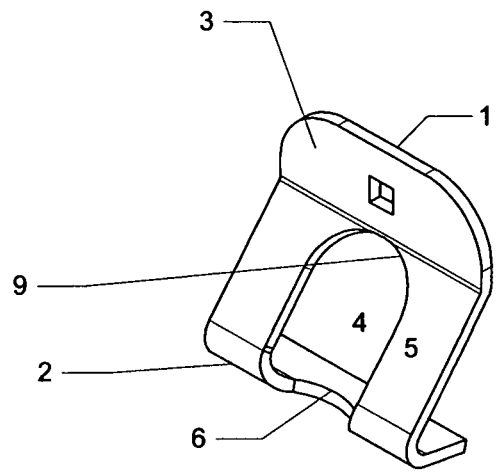

FIG. 23 Isometric view of a closed passage clamp body configured to attach a single round object.

Figure 24:
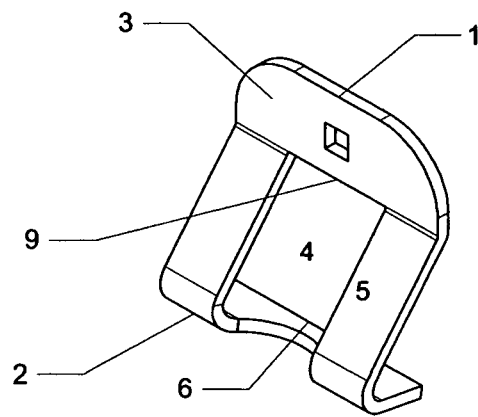

FIG. 24 Isometric view of a closed passage clamp body configured to attach a single rectangular object.

Figure 25:
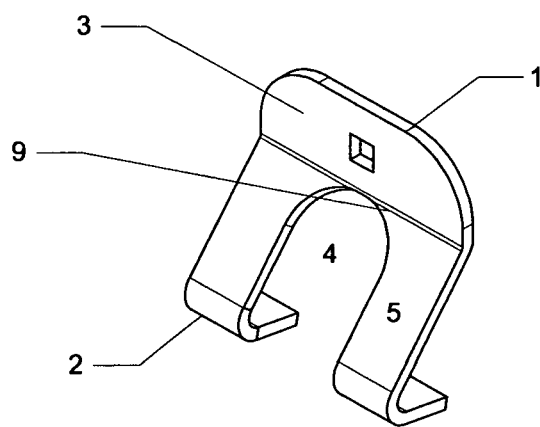

FIG. 25 Isometric view of an open passage clamp body configured to attach a single round object.

Figure 26:
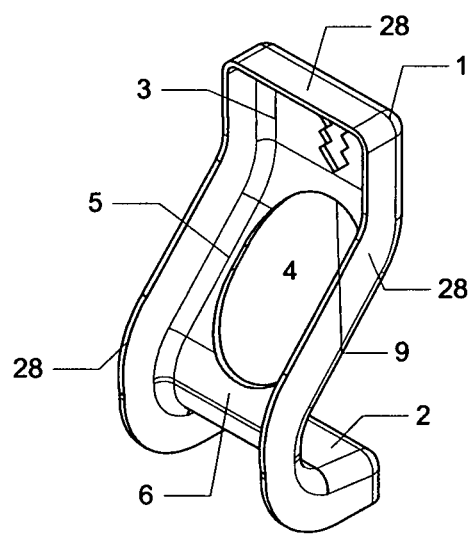

FIG. 26 Isometric view of a closed passage clamp body made from thinner material with flanges to add strength configured to attach a single round object.

Figure 27:
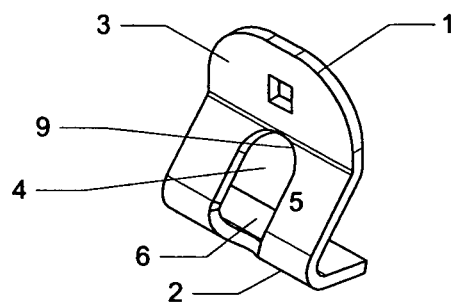

FIG. 27 Isometric view of a closed passage clamp body configured to attach a single round object that is smaller than that shown in FIG. 22.

Figure 28:
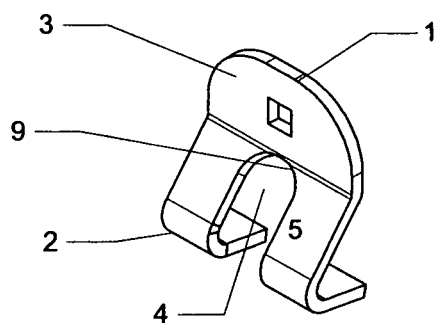

FIG. 28 Isometric view of an open passage clamp body configured to attach a single round object that is smaller than that shown in FIG. 23.

Figure 29:
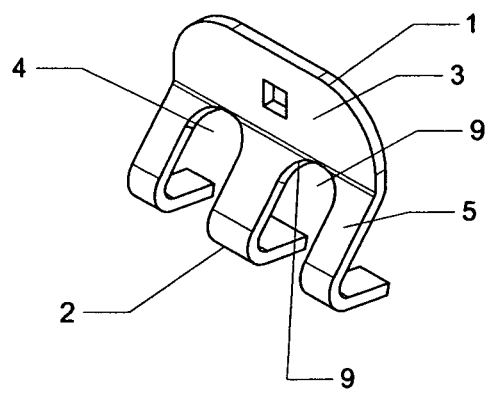

FIG. 29 Isometric view of an open passage clamp body configured to attach a two round objects.

Figure 30:
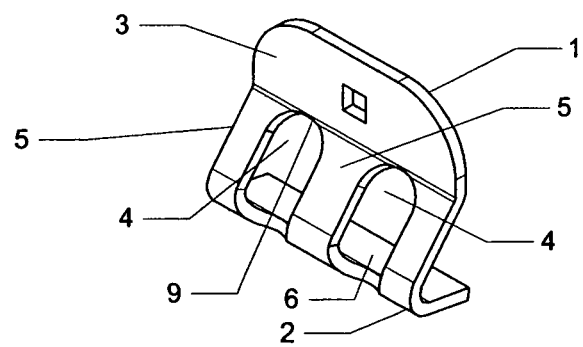

FIG. 30 Isometric view of a closed passage clamp body configured to attach a two round objects.

Figure 31:
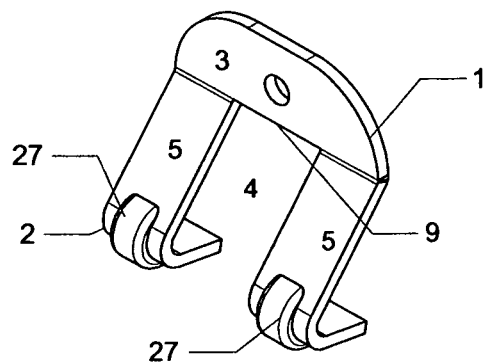

FIG. 31 an isometric view of an open passage clamp body with ribs added to increase strength configured to attach rectangular members. The ribs can run the length of the body or any portion there of.

Figure 32:
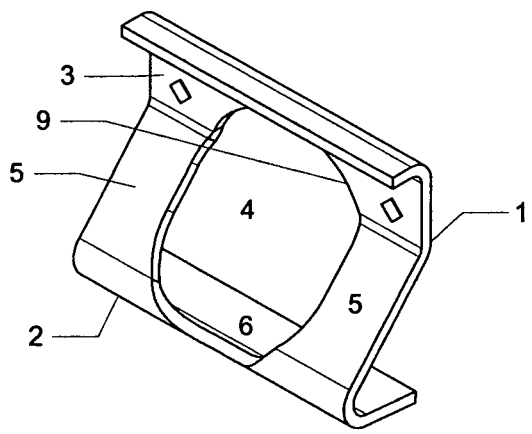

FIG. 32 An isometric view of a closed passage clamp body with 2 bolt holes and strengthening flange added configured to attach a relatively larger round member that is shown in prior figures.

Figure 33:
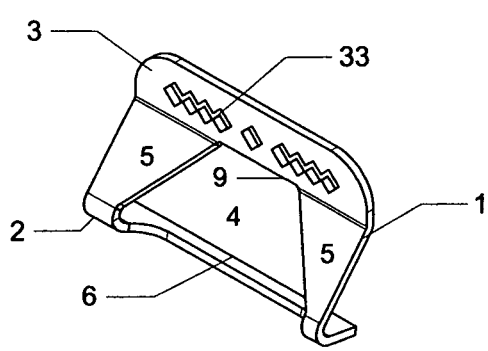

FIG. 33 An isometric view of a closed passage clamp body with multiple boltholes or slots configured to attach rectangular members at an angle between 40 and 90 degrees from the direction of the I-beam type of structure.

FIG. 34 An isometric view of a clamp assembly configured to attach rectangular members at an angle between 45 and 90 degrees from the direction of the I-beam type of structure viewed from the structure side.

FIG. 35 A plane view of a clamp assembly configured to attach rectangular members at an angle between 45 and 90 degrees from the direction of the I-beam type of structure viewed from the attached member side.

FIG. 36 An isometric view of a clamp assembly configured to attach rectangular members at an angle between 45 and 90 degrees from the direction of the I-beam type of structure viewed from the attached member side.

FIG. 37 A end view of a clamp assembly configured to attach rectangular members at an angle between 45 and 90 degrees from the direction of the I-beam type of structure.

Figure 38:
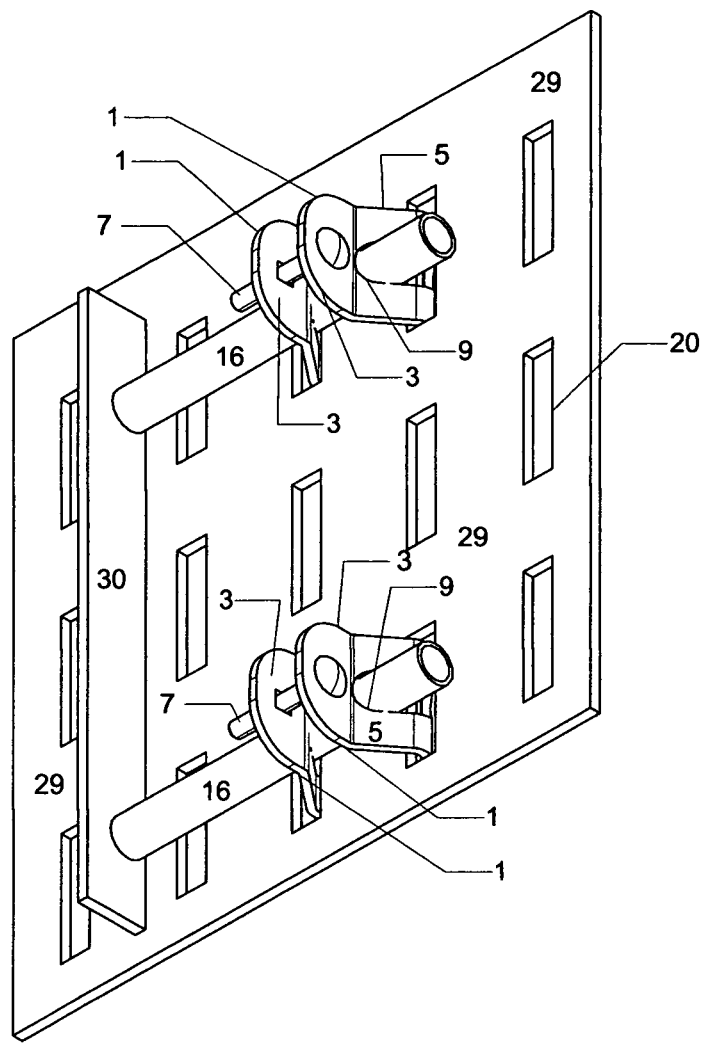

FIG. 38 An isometric view of a plate including clamp assemblies holding round members to the plate that intern are attached to a bar that acts as a fence or stop.

Figure 39:
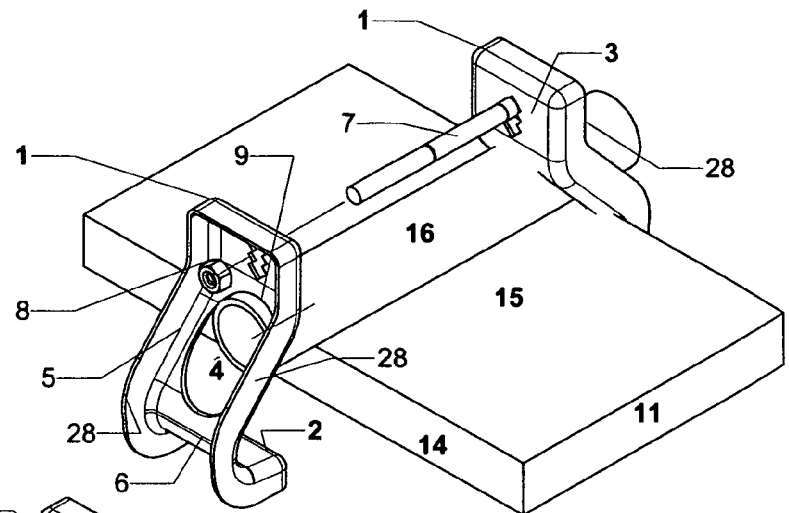

FIG. 39 Isometric partially exploded view of a round member being attached to a plank, board or plate.

Figure 40:
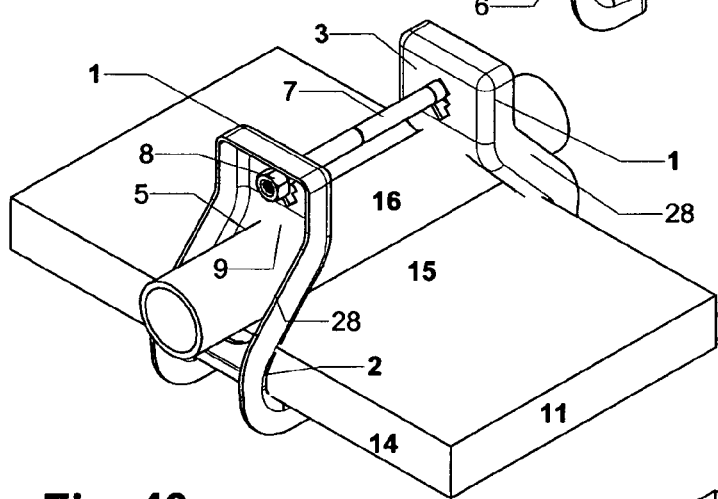

FIG. 40 An isometric view of a round member being attached to a plank viewed from the round member side.

Figure 41:
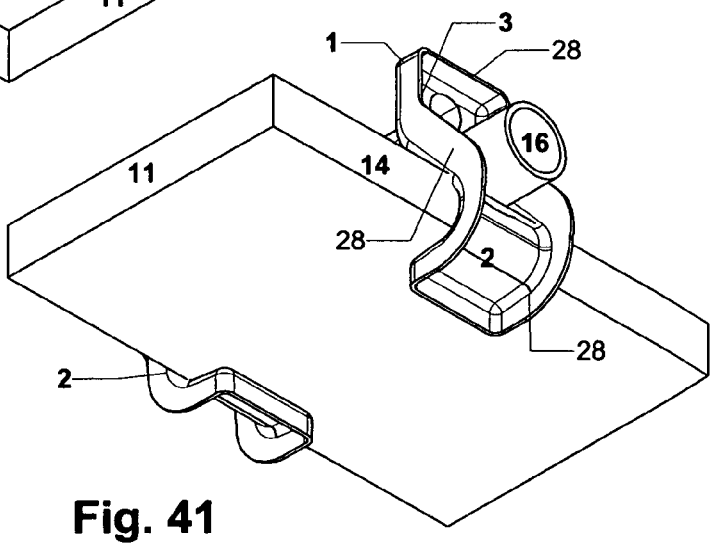

FIG. 41 An isometric view of a round member being attached to a plank viewed from the plank side.

Figure 42:
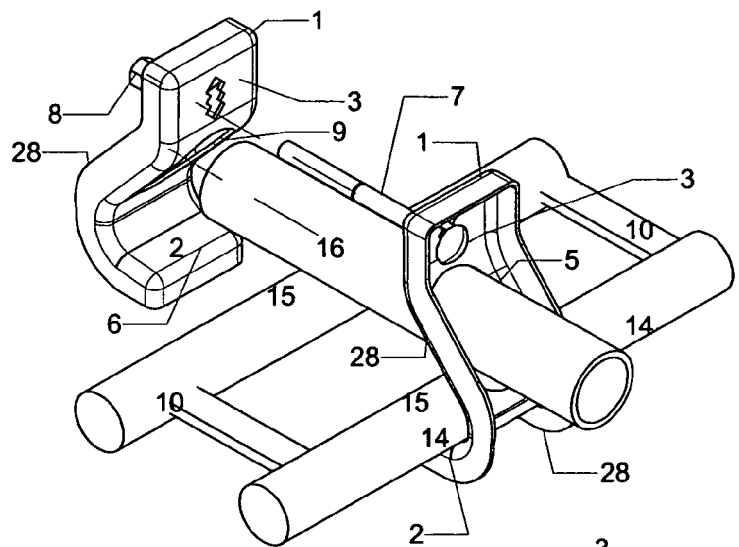

FIG. 42 A partially exploded isometric view of the clamping of a round member to a truss structure that includes two round structural members.

Figure 43:
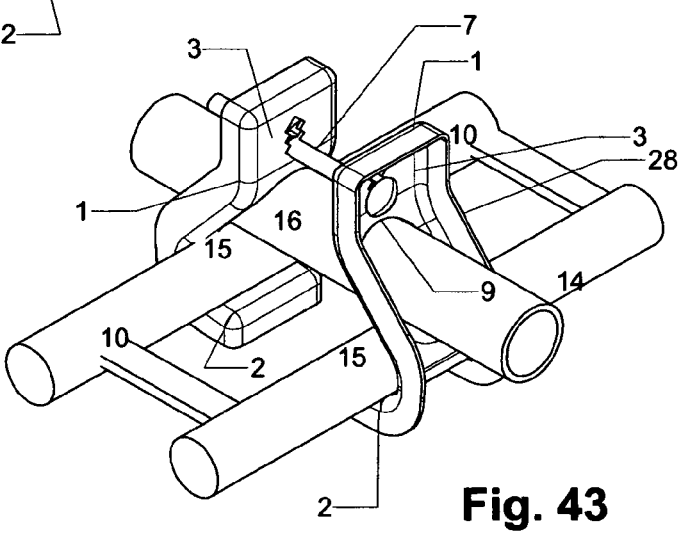

FIG. 43 A partially exploded isometric view of the clamping of a round member to a truss structure that includes two round structural members viewed from the side of the round member.

Figure 44:
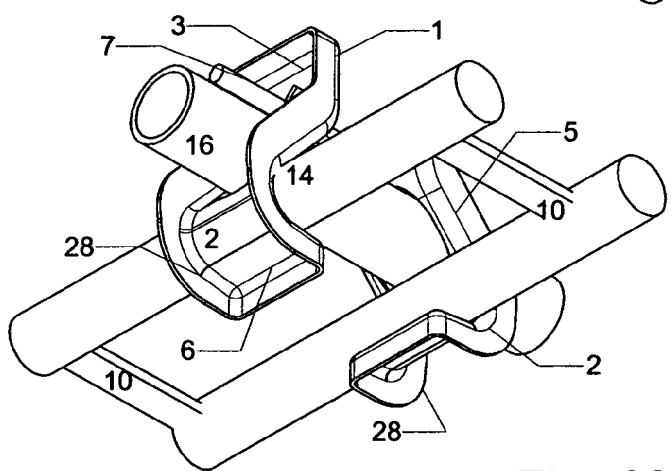

FIG. 44 An isometric view of the clamping of a round member to a truss structure that includes two round structural members viewed from the structure side.

REFERENCE NUMERALS

1 Body
2 Hook end
3 Pulling end
4 Member passage
5 Side connector
6 Hook connecter web
7 Bolt
8 Nut
9 Gripping edge
10 Truss structure
11 Plank
12 Structure member
13 Structure flange
14 Structure edge
15 Structure bearing surface
16 Round member
17 Rectangular member
18 Squeezing channel
19 Clamping bar
20 Cutout
21 Curved Shield
22 Square shield
23 Multi-object channel
24 Two-way block
25 Tubular padding
26 Sling Assembly
27 Rib
28 Flange
29 Mounting Plate
30 Fence 31 Notch
32 Adapter

DETAILED DESCRIPTION

Beam Clamp assembly comprised of two substantially the same opposing bodies 1, with one or more member passage 4, for a corresponding number of elongated objects to pass. The elongated objects, including a round member 16, and a rectangular member 17, being attached against the structure bearing surface 15, and perpendicular to or at an angle of between 40 degrees and 90 degrees to the structure edge 14, of structure member 12, to which the assembly is attached. A method of fastening and pulling towards each other the pulling ends 3, of the clamp body 1, such as a bolt 7, and a nut 8, is included.

The clamp bodies 1, inside surfaces that face each other are substantially shaped like an "?", "S", "2" or "Z" with the hook end 6, forming an acute angle and the bolt end 3, forming an obtuse angle with an optional flange 28 added to the pulling end 3, at preferably a right angle in either direction. Additional features such as flanges 28, ribs 27 can be added to strengthen and stiffen the clamp body 1. The features such as flanges 28, ribs 27 can be an integral part of the clamp body adding bends or thickening portions of the material or adding and attaching the features as is appropriate for the material, size and shape to increase the rigidity and add strength the clamp bodies.

The clamp body 1 can be made of any substantially strong and stiff material or any combination of materials. This includes metals, plastics, and composites. Appropriate methods of manufacturing depend on the type of material, size of clamp body, and shape. The clamp body 1, is comprised of a hooking section that pulls against and allows the clamp body 1 to pivot about the structure edge 14, which can be the outer edges of an I-beam or structure flange 13, then a pulling end 3 where the ends of the two opposing bodies 1 are pulled towards each other and pivots down against the round member 16 or rectangular member 17. There is further, a center portion that has a member passage 4, normally slanted between the pulling end 3, and the hook end 2.

A clamping bar 21, an adapter 32, or squeezing channel 18, can be clamped between the two clamp bodies 1 and then grip and hold round member 16 or rectangular member 17 against and in line with the structure member 12.

A square shield 22, or curved shield 24, holds against a structure member either in line or across the structure protecting, either a member made of a sensitive material, an insulation or padding material protecting a member or allowing the member to slide through the clamp assembly.

An adapter 32, a squeezing channel 18, or a square shield 22, holds a formed block with means for holding a round member 16, or a rectangular member 17, of matching shape and size there by configured to hold the member in either direction.

Multiple configurations using an appropriate size and shape of cutout 20 is included in the adapter 32, to hold the desired size and shape of member.

A beam clamp assembly attaches to a structure member 12, or truss structure 10, including an I-beam cantilevering out in one or both directions to support various loads.

A beam clamp assembly attaches to the structure member 12, or truss structure 10, including an I-beam, running between the structures to support various loads.

A beam clamp assembly attaches the members to planar surfaces such as a plate that has openings allowing engagement of the beam clamps. This clamping method allows adjustment of the members holding them in the direction that it passes through a member passage 4 and holds said member down towards the planar structure bearing surface 15. This is used for creating temporary fences 30 or stops used on a mounting plate 29 or table or other surface used for supporting and containing objects on or against the surface such as is often needed in material handling or manufacturing fixtures.

A beam clamp assembly 1, used to hold a multi-object channel 23 that further holds one or more members such as pipes or conduits essentially in line with structure being clamped. Strut channel that provides an attachment element that holds a variety of member sizes and types using existing hardware clamping methods or can be attached to a structure such as an I-beam and supported by the beam clamp assembly such as is shown in FIG. 3, with the channel passing through the member passage 4. being clamped against the structure element.

A beam clamp used to attach a round object such as the pipe shown in FIG. 4 and FIG. 5 to a structure such as an I-beam.

A beam clamp is used to attach multiple round objects such as the pipes or conduits as is shown in FIG. 6 to a structure member 12, such as an I-beam.

Larger objects such as the pipe or conduit shown in FIG. 7 and FIG. 8 is attached to said structure member 12 such as I-beam or a truss structure 10 uses a beam clamp as is shown that features two fasteners such as bolt 7 and nut 8 and with added flanges for strength. In this instance, note the location for the bolts is to the sides of the member being supported and the bends in the clamp body 1, are so configured, closer to the structure bearing surface 15, to allow this. This configuration allows larger clamp bodies use on structures with narrower contact surfaces or less distance between the structure edges being clamped between than would otherwise be possible.

In FIGS. 9 and 10 beam clamps hold a clamping bar 19, with notches 31, to grip and hold a low profile strut channel against an I-beam, oriented in the same direction as the I-beam and holding the strut channel near the center of the beam flange. This efficiently satisfies a need not addressed by other products on the market.

In FIGS. 11 and 12 beam clamps, hold a squeezing channel 18 that features a cutout 20 to grip and hold a low profile strut channel against an I-beam oriented in the same direction as the I-beam, and holding the strut channel in the center portion of the beam flange. This efficiently satisfies a need not addressed by other products on the market.

In FIGS. 13 and 14 a method of holding sensitive tubing at a right angle to the direction of the I-beam and other structure members 12, in a way that protects the tubing from the gripping edge 9, within the member passage 4 of the clamp body 1. In this case, a foam insulating, tubular padding 25, surrounds the round member 16. A curved shield 21 is placed between the clamp body shaped gripping edge 9 and the tubular padding 25, providing support and protection to the tubular padding and further protects and holds the round member 16. It further allows the round member 16 to slide through the clamp assembly to allow for movement such as is needed for the expansion and contraction in a longitude direction of the round member as temperature changes.

In FIGS. 15 and 16, elements including a round member 16, can be securely and safely held by combining a formed protective element, made of a materials such as plastic or rubber, to grip around pipe, tubing, conduit or other members, holding the members either at a right angle or in line with the structure member 12. In this case captures the round member, not shown, with a two way block 24, made as pair of formed blocks made of a plastic or urethane type of material, formed into two matching complimentary sides that when turned towards each other form cylinder pathways for holding the round structure. The squeezing channel 18 or a square shield 22 captures the two-way block, and holds and protects the said round member 16.

FIGS. 17 and 18 show a beam clamp combined with a pair multi-object channels 23, used to grip and hold multiple round members 16. The cutouts 20 are of a size and shape to securely surround and grip the members essentially holding them in-line with the direction that the structure runs. Multiple cutout sizes and shapes can be intermixed as needed. Multiple size knockouts, not shown, are placed concentric to each other allowing choices of size of round members 16, to be clamped by removal the a corresponding sized portion of the knockout to remove from the multi-object channel.

Load supports for hanging or attaching loads as would be used for a chain to pass are created by using the beam clamps to hold members that has provisions to attach other loads using embodiments including, chains, slings, devises, hoists, and rods. FIGS. 19, 20, 21, show the clamp for larger objects previously discussed in reference to FIG. 7 and FIG. 8, used to attach a pipe with an integral plate with a large hole for a sling type of device to pass.

FIGS. 33, 34, 35, illustrate a pipe and a plank attached to each other using the beam clamp. In this case, the pipe alternately could be the primary structure and the plank could be a member being attached to it. A clamp body as shown in FIG. 26 is illustrated that incorporates a flange 28 around the perimeter of the clamp that adds strength and stiffness thus allowing thinner or less strong material to be used, or to provide added strength.

FIGS. 36,37,38,39 show the use of a beam clamp body 1 that allows a strut channel to fasten on an angle between 40 degrees and 90 degrees from the direction of the I-beam. This is accomplished by first providing a member passage that is elongated more as it is closer to the hook end of the body 1 or the structure bearing surface 15 of the I-beam that it is attached. For rectangular members this amounts to a strait edge at an angle of approximately 45 degrees to the clamping edge. Clamping round members, not shown, require an oblong shaped member passage 4 with the lower portion being stretched out more than the clamping edge. Holes for bolts provide multiple places for bolts to pass in a way that allows for the orientation of the opposing clamp bodies to locate in an offset manner as needed for the particular angle needed and the width of the flange of the I-beam. Multiple holes, slots, and interconnected square cutouts are possible ways to do this.

FIGS. 40, 41, 42, show a pipe clamped to a truss structure 10, generally made from elements including round shapes. Rectangular members 17 are attached in the same way.

ADVANTAGES

My invention provides improvements in ways objects are attached to each other and provides methods for attaching not currently feasible. Strut channels, pipes, conduits, boards and other members and objects can be attached in line with an I-beam FIGS. 9,10,11,12, particularly in the center of the outside of an I-beam flange without drilling holes or welding. This is accomplished by using a clamping bar 19, a square shield 22, a curved shield 21, an adapter 32, or squeezing channel 18, that uses the same clamp described above to securely hold any object between the clamp bodies, which then holds a rectangular member 17, or a round member 16 to a structure member 12 such as an I-beam. There are also different shapes that can be attached by using an appropriate cross member adapter. Square shields 22, curved shields 21 can capture protective padding or insulating materials to allow attachment of sensitive members in either direction and to allow for movement such as is caused by expansion and contraction resulting from changes in temperature.

Another advantage of this invention is that it allows supported members to attach to a wide range of sizes and shapes of I-beams and other configurations for each size of clamp. Within a range of widths and flange thicknesses of a beam or other configurations, the same size clamp can be used with the only change, being the length of bolt 7 needed for providing the squeezing action between the two bodies 1 of the clamping assembly.

A larger style of clamp assembly FIG. 7, 8,19,20,21 can use multiple bolts for pulling together along with a bent flange across the bolted end to add strength and rigidity for holding larger pipes and other members being secured or attached.

Clamping apparatus for holding an assembly including bearing for wheels or pulleys etc to operate.

Not shown: This beam clamp used to connect a series of I-beams or trusses that are arranged in generally parallel to each other using either round or rectangular members provides stiffening and bracing to the overall structure made up of the said I-beams and said trusses. This beam clamp can be used as a permanent fastener or as a fastener that can be used to quickly assemble or disassemble simple and complex structures that are temporary and can be assembled in different ways.

CONCLUSION, RAMIFICATION, AND SCOPE

This beam clamp allows attachment of channel struts, pipes, conduit, to the interior of buildings in ways not currently done due to a lack of an efficient and strong way for attachment to structures such as I-Beams and truss structures. A number of new methods for attaching or mounting hardware are possible using this invention. The clamp bodies along with appropriate accessories comprising such adapters, as shown in FIG. 22.

I claim:

1. A beam clamp for clamping an elongated object, wherein said beam claim comprises:

a pair of similar opposing clamp bodies that have a cross section on an interior surface of each clamp body shaped like a "question mark" (?) and is arranged in an assembly where the opposing clamp bodies face and mirror each other wherein each clamp body continuously includes a top flat portion including a hole for a fastener the top flat portion generally defining a top flat portion plane, a middle portion of the clamp body angularly extending away from the flat portion plane and each said clamp body comprising a continuous hook end portion angularly extending from the middle portion towards the plane of the top flat portion and generally perpendicular to the plane of the flat portion of the body clamp, which captures and pivots around two outward facing parallel edges of a structure member;

each said clamp body comprising a member passage located between said hook end portion and a puling end and fully surrounded by the clamp body, and sized to capture an elongated object allowing said elongated object to pass through said member passage of each clamp body, wherein each said clamp body further comprises an interior gripping edge to engage the elongated object on the end of the member passage opposite the continuous hook end portion; and wherein said pulling end surrounds said elongated object and provides a means for a fastener, located above the elongated object and away from said structure member, wherein said fastener pulls said opposing clamp bodies toward each other, being restrained by said hook portion which pivots around said outward facing parallel edges of said structure member and causes said interior gripping edge to pivot and bear against said elongated object, clamping it against said structure member and wherein said gripping edge of said member passage has a thickness of said pulling end.

2. The beam clamp in claim 1, where a plurality of passages in said clamp body is sized and shaped to capture multiple elongated objects allowing the elongated objects to pass through, that includes an interior gripping edge to engage the multiple elongated objects on the end of the passage opposite the hook portion.

3. The beam clamp in claim 1, wherein multiple said fasteners are used to pull the said clamp bodies toward each other.

4. The beam clamp in claim 1, wherein said interior gripping edge is curved or shaped to grip curved said elongated objects.

5. The beam clamp in claim 1, wherein said interior gripping edge is straight to grip rectangular said elongated objects and the interior passage has a continuous hooking end.

6. The beam clamp in claim 1 wherein ribs, thickening of material, flanges or attached stiffener is incorporated on said clamp body to add rigidity and strengthen the material used in the clamp body.

7. The beam clamp of claim 1 wherein the beam clamp is configured to allow a member to pass through at an angle between 40 and 90 degrees from the direction of a structure that the member is attached to by increasing a width of said passageway beginning at the pulling end as it approaches the point of contact with the structural member.

8. The beam clamp in claim 1, where the beam clamp directly holds one or more cross members configured to match predetermined shapes and sizes of elongated objects allowing them to be held to a structural member in ways that include:
   the cross member holds elongated objects that are a different size or shape than the beam clamp is configured to directly hold, adapting the beam clamp for attaching multiple sized and shapes of elongated objects to the said structural member;
   two opposing channels with optional cutouts sized to capture and hold one or more said elongated members in line with the said structural member or perpendicular to the said planar surfaces of the said structural member;
   a shield, partially surrounding and protecting from the beam clamp, one or more bars used to hold and protect elongated members being clamped to the said structural member;
   a shield, partially surrounding and protecting from the beam clamp, compressible bars or tubular padding used to hold and protect elongated members being clamped to the said structural member.

9. A beam clamp comprising:
   a pair of similar opposing clamp bodies that have a cross section on the interior surface of each said clamp body shaped like a "question mark" (?) and is arranged in an assembly where the opposing clamp bodies generally face and mirror each other wherein each clamp body continuously includes a to flat portion including a hole for a fastener the to flat portion generally defining a top flat portion plane, a middle portion of the clamp body angularly extending away from the flat portion plane and
   each said clamp body comprises a non-continuous hook portion comprising a plurality of hooks angularly extending from the middle portion towards the plane of the top flat portion and generally perpendicular to the plane of the flat portion of the body clamp, which captures and pivots around two outward facing parallel edges of a structure member;
   each said clamp body comprising a member passage located between said hook end portion and a pulling end and fully surrounded by the clamp body, and sized to capture an elongated object allowing said elongated object to pass through said member passage of each clamp body, wherein each said clamp body further comprises an interior gripping edge to engage the elongated object on the end of the passage opposite the non-continuous hook portion; and
   wherein said pulling end surrounds said elongated object and provides a means for a fastener, located above the elongated object and away from said structure member, wherein said fastener pulls said opposing clamp bodies toward each other, being restrained by the said non-continuous hook portion which pivots around the said outward facing parallel edges of the said structure member and causes the said interior gripping edge to pivot and bear against the said elongated object, clamping it against said structure member and wherein said gripping edge of said passage has a thickness of the pulling end.

10. The beam clamp in claim 9, wherein a plurality of passages in said clamp body sized and shaped to capture multiple elongated objects allowing them to pass through, that includes a interior gripping edge to engage the elongated object on the end of the passage opposite the non-continuous hook portion.

11. The beam clamp in claim 9, wherein said interior gripping edge is curved to grip curved or shaped to grip said elongated objects.

12. The beam clamp in claim 9, wherein multiple said fasteners are used to pull the said clamp bodies toward each other.

13. The beam clamp in claim 9, wherein one or more ribs, thickening of material, flange or attached stiffener is incorporated on the said clamp body to add rigidity and strengthen the material used in the clamp body to add rigidity and strengthen the material used in the clamp body.

14. The beam clamp in claim 9, configured to allow a member to pass through at an angle between 40 and 90 degrees from the direction of the structure that the member is attached to by increasing the width of said passageway as it approaches the point of contact with the structural member.

15. The beam clamp in claim 9, where the beam clamp directly holds one or more cross members configured to match predetermined shapes and sizes of elongated objects allowing them to be held to a structural member in ways that include:
   the cross member holds elongated objects that are a different size or shape than the beam clamp is configured to directly hold, adapting the beam clamp for attaching multiple sized and shapes of elongated objects to the said structural member;
   two opposing channels with optional cutouts sized to capture and hold one or more said elongated members in line with the said structural member or perpendicular to the said planar surfaces of the said structural member; and
   a shield, partially surrounding and protecting from the beam clamp, one or more bars used to hold and protect elongated members being clamped to the said structural member; a shield, partially surrounding and protecting from the beam clamp, compressible bars or tubular padding used to hold and protect elongated members being clamped to the said structural member.

* * * * *